(12) United States Patent
Bitra et al.

(10) Patent No.: US 9,709,660 B1
(45) Date of Patent: Jul. 18, 2017

(54) CROWDSOURCED USER DENSITY APPLICATIONS

(71) Applicant: QUALCOMM Incorporated, San Diego, CA (US)

(72) Inventors: Suresh Kumar Bitra, Mangalgri (IN); Meghna Agrawal, Sunnyvale, CA (US); Ashok Bhatia, San Diego, CA (US); Wei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/992,336

(22) Filed: Jan. 11, 2016

(51) Int. Cl.
*H04W 24/00* (2009.01)
*G01S 5/02* (2010.01)
*H04W 64/00* (2009.01)
*G01S 5/14* (2006.01)

(52) U.S. Cl.
CPC .............. *G01S 5/0252* (2013.01); *G01S 5/14* (2013.01); *H04W 64/006* (2013.01)

(58) Field of Classification Search
CPC ....... G01S 5/0252; G01S 5/14; H04W 64/006
USPC ...................................................... 455/456.1
See application file for complete search history.

(56) References Cited

U.S. PATENT DOCUMENTS

| | | | | |
|---|---|---|---|---|
| 6,009,206 | A | * 12/1999 | Acharya | G06T 3/40 358/466 |
| 7,899,006 | B2 | * 3/2011 | Boyd | G01S 5/021 370/328 |
| 8,116,787 | B1 | 2/2012 | Lektuai | |
| 8,588,808 | B2 | * 11/2013 | Levin | G01S 5/0252 455/456.1 |
| 8,589,318 | B2 | * 11/2013 | Sundararajan | H04L 12/6418 703/2 |
| 8,831,633 | B2 | * 9/2014 | Moshfeghi | G01S 19/48 455/456.1 |
| 8,934,921 | B2 | * 1/2015 | Marti | G01C 21/10 455/456.2 |
| 8,938,255 | B2 | * 1/2015 | Tsruya | G01S 5/0252 455/404.2 |
| 8,977,284 | B2 | * 3/2015 | Reed | H04W 8/02 455/404.2 |
| 9,098,723 | B2 | * 8/2015 | Petersen | G06Q 10/10 |
| 9,213,082 | B2 | * 12/2015 | Aggarwal | G01S 5/0205 |
| 9,445,241 | B2 | * 9/2016 | Chen | H04W 4/043 |
| 9,510,141 | B2 | * 11/2016 | Soto Matamala | G06F 17/3089 |

(Continued)

FOREIGN PATENT DOCUMENTS

EP  2337309 A1  6/2011

OTHER PUBLICATIONS

International Search Report and Written Opinion—PCT/US2016/065547—ISA/EPO—Feb. 16, 2017—11 pgs.

*Primary Examiner* — Marceau Milord
(74) *Attorney, Agent, or Firm* — Hunter Clark PLLC

(57) ABSTRACT

A method of using user density includes: producing a first map portion corresponding to a first region and a second map portion corresponding to a second region, the first map portion having a first resolution and the second map portion having a second resolution, the first resolution being lower than the second resolution, at least one of the first resolution being dependent on a user density of the first region or the second resolution being dependent on a user density of the second region; and sending the first map portion and the second map portion to a destination mobile device.

22 Claims, 5 Drawing Sheets

(56) References Cited

U.S. PATENT DOCUMENTS

| | | | |
|---|---|---|---|
| 2009/0205019 A1 | 8/2009 | Treu | |
| 2010/0039929 A1* | 2/2010 | Cho | G01S 5/0252 |
| | | | 370/216 |
| 2010/0197318 A1* | 8/2010 | Petersen | G06Q 10/10 |
| | | | 455/456.1 |
| 2011/0176494 A1* | 7/2011 | Huang | G01S 5/02 |
| | | | 370/329 |
| 2013/0065613 A1 | 3/2013 | Stopel | |
| 2013/0321411 A1* | 12/2013 | Pahwa | G06T 15/005 |
| | | | 345/420 |
| 2013/0337830 A1* | 12/2013 | Haro | H04W 4/02 |
| | | | 455/456.1 |
| 2013/0345958 A1 | 12/2013 | Paek et al. | |
| 2014/0179237 A1* | 6/2014 | Gao | H04W 4/025 |
| | | | 455/67.11 |
| 2014/0222332 A1 | 8/2014 | Lee et al. | |
| 2014/0250191 A1* | 9/2014 | Altman | G06Q 30/0207 |
| | | | 709/204 |
| 2014/0364138 A1* | 12/2014 | Huang | G01S 19/11 |
| | | | 455/456.1 |
| 2016/0021494 A1* | 1/2016 | Yang | H04W 4/02 |
| | | | 455/41.2 |
| 2016/0330643 A1* | 11/2016 | Sahin | H04W 16/14 |

\* cited by examiner

CROWDSOURCED USER DENSITY APPLICATIONS

BACKGROUND

As the use of mobile devices has proliferated, so too have computer applications using the location of the mobile devices. The location of mobile devices may be determined in a variety of ways. For example, in terrestrial downlink positioning (TDP), pilot signals from base stations may be measured to determine one or more positioning parameters. The positioning parameter(s) may in turn be used to determine a location of the mobile device, e.g., using multilateration techniques. The accuracy of the determined position of the mobile device often depends on the accuracy with which the positioning parameter(s) is(are) determined.

Knowing the location of a mobile device, various services may be provided to the mobile device. For example, navigation information including a map and/or turn-by-turn directions from the mobile device's location to a destination may be provided. Further, crowdsourced information such as user reviews of nearby stores may be provided to the mobile device, e.g., in conjunction with the map. Another example of crowdsourced data is traffic information provided in conjunction with a map, e.g., showing areas of current high and low traffic congestion.

SUMMARY

An example of a method of using user density includes: producing a first map portion corresponding to a first region and a second map portion corresponding to a second region, the first map portion having a first resolution and the second map portion having a second resolution, the first resolution being lower than the second resolution, at least one of the first resolution being dependent on a user density of the first region or the second resolution being dependent on a user density of the second region; and sending the first map portion and the second map portion to a destination mobile device.

Implementations of such a method may include one or more of the following features. The method further includes: receiving, from source mobile devices, indications of access point detection corresponding to the first region and the second region; and determining the user density of the first region and the user density of the second region using the indications of access point detection corresponding to the first region and the second region, respectively. Determining the user density of the first region comprises determining a quantity of unique source mobile devices from which the indications of access point detection corresponding to the first region have been received. Determining the user density of the first region comprises determining a historical user density for each of a plurality of time windows. The first resolution is dependent on the user density of the first region and corresponds to the user density of the first region being below a threshold user density. The method further includes: determining that a user density corresponding to a mobile-device map portion, that includes a present location of the destination mobile device, is below the threshold user density; and sending the mobile-device map portion to the destination mobile device with the second resolution. The method further includes sending, to the destination mobile device, a popularity indication of a venue within the first map portion or the second map portion. The method further includes determining and sending, to the destination mobile device, an indication of at least one of an opening time of a venue or a closing time of the venue based on a change in a historical user density associated with the venue and corresponding to at least one of the opening time or the closing time, respectively, the venue being within the first map portion or the second map portion.

An example of a server includes: a memory; a transceiver; and a processor, communicatively coupled to the memory and the transceiver and configured to: produce a first map portion corresponding to a first region and a second map portion corresponding to a second region, the first map portion having a first resolution and the second map portion having a second resolution, the first resolution being lower than the second resolution, at least one of the first resolution for the first map portion being dependent on a user density of the first region or the second resolution being dependent on a user density of the second region; and send, via the transceiver, the first map portion and the second map portion to a destination mobile device.

Implementations of such a server may include one or more of the following features. The processor is further configured to: receive, from source mobile devices via the transceiver, indications of access point detection corresponding to the first region and the second region; and determine the user density of the first region and the user density of the second region using the indications of access point detection corresponding to the first region and the second region, respectively. To determine the user density of the first region the processor is configured to determine a quantity of unique source mobile devices from which the processor has received indications of access point detection corresponding to the first region. To determine the user density of the first region the processor is configured to determine a historical user density for each of a plurality of time windows. The first resolution is dependent on the user density of the first region and corresponds to the user density of the first region being below a threshold user density. The processor is further configured to: determine that a user density corresponding to a mobile-device map portion, that includes a present location of the destination mobile device, is below the threshold user density; and send the mobile-device map portion to the destination mobile device with the second resolution. The processor is further configured to determine and send, to the destination mobile device, a popularity indication of a venue within the first map portion or the second map portion. The processor is further configured to send, to the destination mobile device, an indication of at least one of an opening time of a venue or a closing time of the venue based on a change in a historical user density associated with the venue and corresponding to at least one of the opening time or the closing time, respectively, the venue being within the first map portion or the second map portion.

An example of a non-transitory processor-readable storage medium stores processor-readable instructions configured to cause a processor to: produce a first map portion corresponding to a first region and a second map portion corresponding to a second region, the first map portion having a first resolution and the second map portion having a second resolution, the first resolution being lower than the second resolution, at least one of the first resolution being dependent on a user density of the first region or the second resolution being dependent on a user density of the second region; and send the first map portion and the second map portion to a destination mobile device.

Implementations of such a storage medium may include one or more of the following features. The storage medium further includes instructions configured to cause the processor to: receive, from source mobile devices, indications of access point detection corresponding to the first region and the second region; and determine the user density of the first region and the user density of the second region using the indications of access point detection corresponding to the first region and the second region, respectively. The instructions configured to cause the processor to determine the user density of the first region include instructions configured to cause the processor to determine a quantity of unique source mobile devices from which the processor has received indications of access point detection corresponding to the first region. The instructions configured to cause the processor to determine the user density of the first region include instructions configured to cause the processor to determine a historical user density for each of a plurality of time windows. The first resolution is dependent on the user density of the first region and corresponds to the user density of the first region being below a threshold user density. The storage medium further includes instructions configured to cause the processor to: determine that a user density corresponding to a mobile-device map portion, that includes a present location of the destination mobile device, is below the threshold user density; and send the mobile-device map portion to the destination mobile device with the second resolution. The storage medium further includes instructions configured to cause the processor to determine and send, to the destination mobile device, an indication of at least one of an opening time of a venue or a closing time of the venue based on a change in a historical user density associated with the venue and corresponding to at least one of the opening time or the closing time, respectively, the venue being within the first map portion or the second map portion.

Another example of a server includes: means for producing a first map portion corresponding to a first region and a second map portion corresponding to a second region, the first map portion having a first resolution and the second map portion having a second resolution, the first resolution being lower than the second resolution, at least one of the first resolution dependent on a user density of the first region or the second resolution being dependent on a user density of the second region; and means for sending the first map portion and the second map portion to a destination mobile device.

Implementations of such a server may include one or more of the following features. The server further includes: means for receiving, from source mobile devices, indications of access point detection corresponding to the first region and the second region; and means for determining user density for each of the first region and the user density of the second region using the indications of access point detection corresponding to the first region and the second region, respectively. The means for determining the user density of the first region comprise means for determining a quantity of unique source mobile devices from which the indications of access point detection corresponding to the first region have been received. The means for determining the user density of the first region comprise means for determining a historical user density for each of a plurality of time windows. The first resolution is dependent on the user density of the first region and corresponds to the user density of the first region being below a threshold user density. The server further includes: means for determining that a user density corresponding to a mobile-device map portion, that includes a present location of the destination mobile device, is below the threshold user density; and means for sending the mobile-device map portion to the destination mobile device with the second resolution. The server further includes means for determining and sending, to the destination mobile device, an indication of at least one of an opening time of a venue or a closing time of the venue based on a change in a historical user density associated with the venue and corresponding to at least one of the opening time or the closing time, respectively, the venue being within the first map portion or the second map portion.

DETAILED DESCRIPTION

Techniques are discussed herein for determining and using user density. For example, mobile devices may detect access points and produce a scan list of the access points that the mobile devices detect. The mobile devices may report their scan lists to a server and the server can use the number of scan lists received that indicate detection of particular access points to determine user densities for various regions. For example, the server may determine user density for each access point, with the relevant regions being the ranges of the access points. Also or alternatively, the server may determine user density for a geographic tile (typically a 1 km×1 km geographical block). The user density may be determined based on total number of scan lists received, number of scan lists received per unit of time (e.g., time windows, day/time combinations such as weekday rush hour(s), etc.), number of scan lists received from unique mobile devices, or combinations of these. Further, the user density may be a historical user density, e.g., all (unique) mobile device visits detected to date. The user density for a region may be used in a variety of manners, e.g., to provide map information to a mobile device where the map resolution is lower for portions of the map corresponding to low user density regions. User density may be provided to indicate popularity of a venue, e.g., overall popularity, popularity for different time windows, etc. Information may be inferred from user density, e.g., opening time and/or closing time of a venue, which may contradict published information for the venue. These examples, however, are not exhaustive.

Items and/or techniques described herein may provide one or more of the following capabilities, as well as other capabilities not mentioned. Geofences may be created and user density in the geofences provided. Resources for sending, processing, and/or storing maps may be reduced compared to present techniques. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
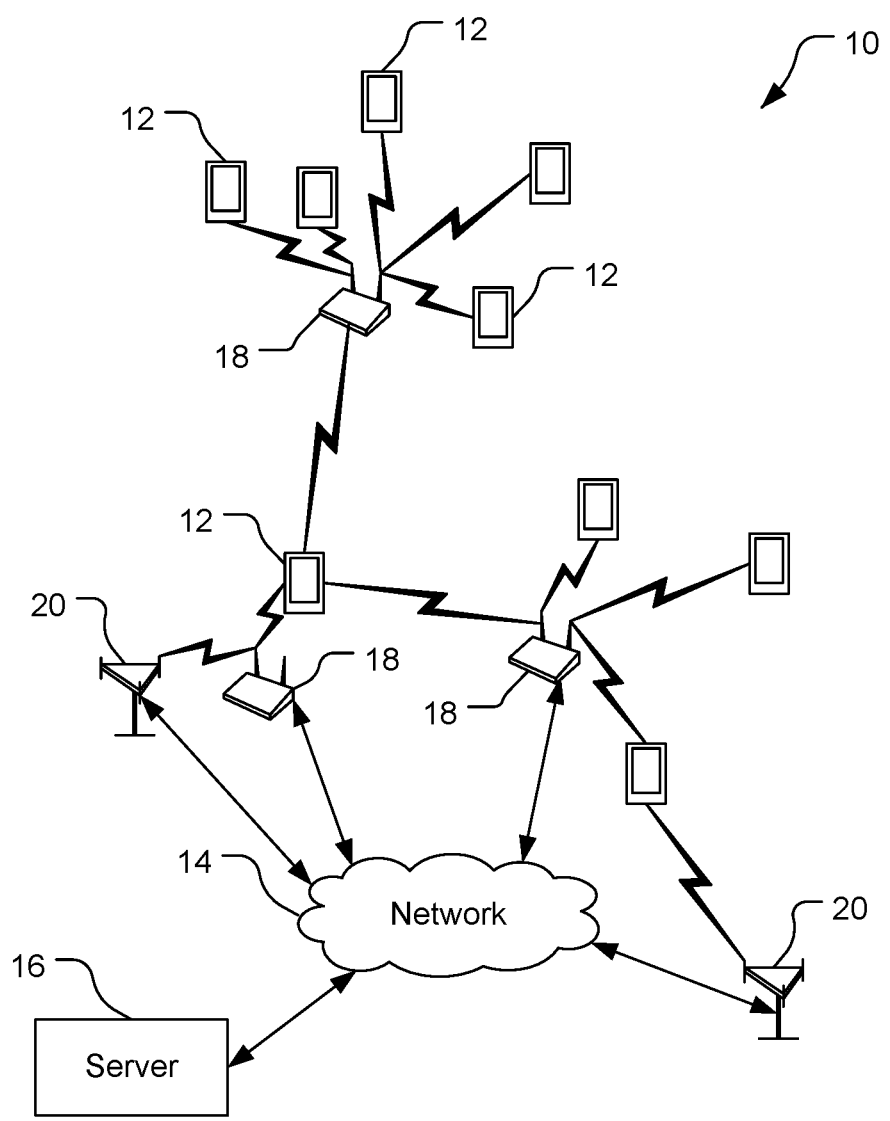
FIG. 1 is a simplified diagram of a communication system.

Referring to FIG. 1, a wireless communication system 10 includes mobile devices 12, a network 14, a server 16, access points (APs) 18, and base stations 20. The system 10 is a communication system in that components of the system 10 can communicate with one another directly or indirectly, e.g., via the network 14 and/or one or more of the access points 18 and/or the base stations 20. For example, the base stations 20 and the mobile devices 12 may communicate using signals according to one or more protocols such as GSM, CDMA, or OFDM. The quantities of the access points 18 and the base stations 20 are examples only, and other quantities of access points 18 and/or base stations 20 may be used. Also, while all the mobile devices 12 are shown as smart phones, other types of mobile devices may be used such as laptop computers, tablet computers, and/or mobile phones that are not smartphones. Still other mobile devices may be used, whether currently existing or developed in the future. The term "mobile devices" does not limit the mobile devices 12 to any particular form, protocol, etc. For example, the mobile devices 12 may be referred to by other names such as mobile terminals, user equipment, mobile stations, etc. Also, the term "base stations" does not limit the base stations 20 to any particular form, protocol, etc. For example, any of the base stations 20 (and/or other base stations not shown) may be referred to as a base transceiver station (BTS), an access node (AN), a Node B, an evolved Node B (eNB), etc.

Figure 2:
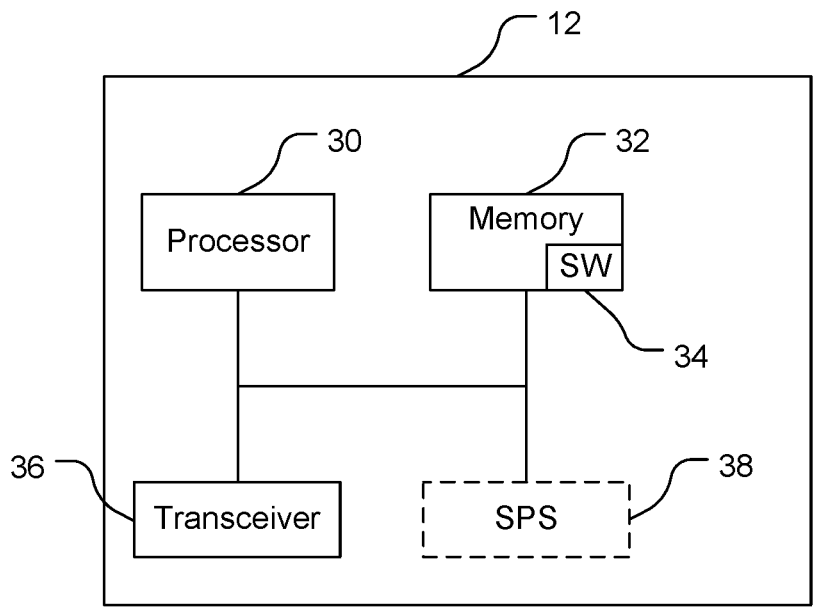
FIG. 2 is a simplified block diagram of components included in a mobile device shown in FIG. 1.

Referring also to FIG. 2, an example of the mobile devices 12 comprises a computer system including a processor 30, memory 32 including software 34, and a transceiver 36. The transceiver 36 includes one or more antennas and is configured to communicate bi-directionally with the access points 18 and the base stations 20, and/or one or more other entities, and may include an antenna to receive satellite positioning system (SPS) signals. The transceiver 36 is configured to send and receive signals from and to the access points 18 and the base stations 20, and optionally to receive signals from the satellites if the SPS 38 is included. The processor 30 preferably includes an intelligent hardware device, e.g., a central processing unit (CPU) such as those made or designed by QUALCOMM®, ARM®, Intel® Corporation, or AMD®, a microcontroller, and/or an application specific integrated circuit (ASIC), etc. The processor 30 may comprise multiple separate physical entities that can be distributed in the mobile device 12. The memory 22 includes random access memory (RAM) and read-only memory (ROM). The memory 32 is a non-transitory processor-readable storage medium that stores the software 34 which is processor-readable, processor-executable software code containing processor-readable instructions that are configured to, when executed, cause the processor 30 to perform various functions described herein (although the description may refer only to the processor 30 performing the functions). Alternatively, the software 34 may not be directly executable by the processor 30 but configured to cause the processor 30, e.g., when compiled and executed, to perform the functions. The processor 30 is communicatively coupled to the memory 32 and the transceiver 36 and configured to perform a variety of functions, e.g., in accordance with the software 34.

The processor 30 is configured to coordinate passive scans. The processor 30 is configured to cause the transceiver 36 to listen for signals on different frequencies that may be used by the APs 18 to send signals, e.g., pilot signals. That is, the processor 30 is configured to cause the transceiver 36 to tune to different frequencies for receiving signals from the APs 18. The transceiver 36 is configured to relay the signals received from the APs 18 to the processor 30. The processor 30 is configured to perform process signals received by the transceiver 36 to identify the APs 18 from which signals, e.g., pilot signals, are received, and thus the corresponding APs 18 that are detected. The processor 30 is configured to process the received AP signals to determine the APs 18 that are detected. The processor 30 may cause passive scans periodically, at consistent intervals, resources permitting.

The processor 30 may further be configured to determine a location of the mobile device 12. For example, the processor 30 may analyze the signals received from the APs 18 and/or the base stations 20 to determine received signal strength indications (RSSIs) and known locations of the APs 18 (e.g., provided by the server 16) and/or the base stations 20. Optionally, the processor 30 may process SPS signals received via the transceiver 36 to determine the location of the mobile device 12. The processor 30 may use the signals from the APs 18, the base stations 20, and/or the satellites to perform multilateration to determine the location of the mobile device 12.

Figure 3:
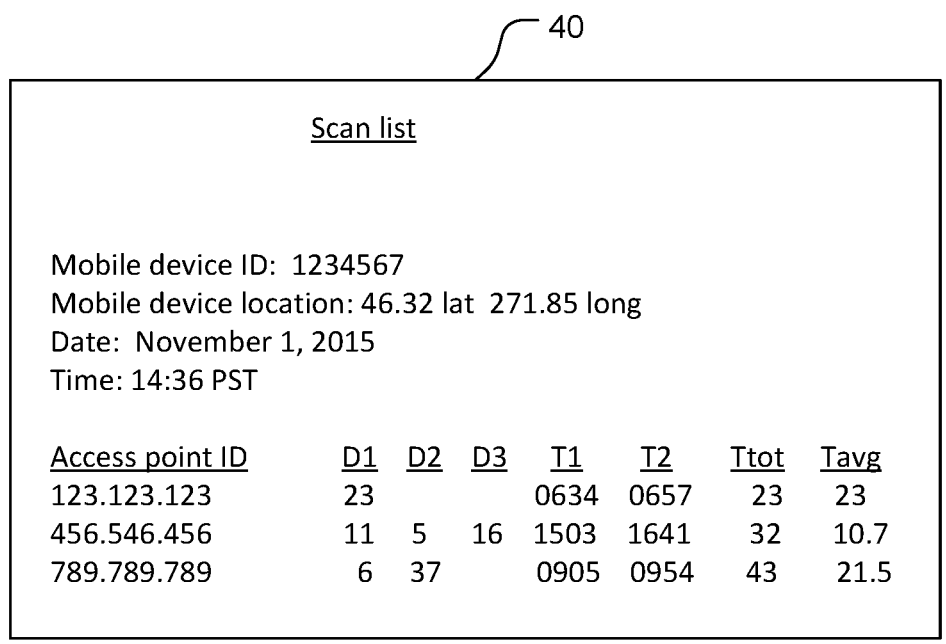
FIG. 3 is a simplified diagram of an example of a scan list produced by the mobile device shown in FIG. 2

Referring also to FIG. 3, the processor 30 is configured to produce a scan list 40 that includes information regarding the APs 18 that the mobile device 12 detected during a scan. Preferably, the processor 30 is configured to aggregate information for all the APs 18 that the mobile device 12 detected on its most-recent passive scan into the scan list 40. The scan list 40 preferably includes indications of the mobile device identity (ID), (optionally) the mobile device location, the date, the time (e.g., of the passive scan or production of the scan list 40), and the access point identities. The list of the access point IDs are indications of access point detection by the mobile device 12, i.e., indications of receipt of a signal from each of the listed access points. The scan list 40 may optionally include indications of locations of the access points 18 corresponding to the indicated access point IDs. The processor 30 may obtain the locations by, for example, reading indications of the locations that are included in the signals received from the access points 18. Further, the scan list 40 could include further information such as RSSI for each of the APs 18.

The mobile device 12 is configured to send the scan list 40 to the server 16. The mobile device 12 may send the scan list 40 each time that the mobile device 12 generates the scan list 40, at scheduled times, periodically at regular intervals (where the intervals may change, e.g., becoming less frequent at certain times such as between midnight and 5:00 AM), in response to a change in the access points 18 detected (e.g., a change in the list of access points 18 between consecutive scan lists), or a combination of two or more of these, and/or at other times. Also or alternatively, the mobile device 12 may send the scan list in response to entering or exiting a venue, and/or in response to entering or exiting a region such as a geographic tile (which may be referred to simply as a tile). Preferably, the mobile device 12 sends the scan list 40 to the server 16 at least in response to entering a venue or a tile.

The mobile device 12 may be configured to send one or more indications of time(s) within communication range of one or more of the access points 18 during a report interval (e.g., the time between consecutive reports of the scan list 40), particularly if the mobile device 12 is configured to send the scan list 40 at scheduled times and/or at regular intervals. For example, the mobile device 12 may be configured to save an indication of each access point 18, e.g., an access point A1, detected along with a detection timestamp (T1) corresponding to when the access point A1 was first detected (or re-detected after not being detected), and to save a no-detection timestamp (T2) of the next scan time during which the access point A1 is not detected (e.g., because the mobile device 12 moved away from the coverage area of the access point A1). The mobile device 12, e.g., the processor 30, may determine a difference D1 between the two timestamps T1, T2 as a time spent within a coverage area of the access point A1 (even though the actual time spent in the coverage range may not be exactly equal to T2–T1 due to scans not being performed continuously). The mobile device 12 may store multiple T1 and T2 timestamps for each access point 18, e.g., due to the mobile device 12 repeatedly entering and exiting the coverage area of the corresponding access point 18. The processor 30 may determine and store, in the memory 32, multiple differences D1, D2, . . . DN for each of the access points 18 detected. The difference(s) DX for each of the access points 18 detected may be sent to the server 16 along with or as part of the scan list 40 (while no more than three differences DX are shown in FIG. 3, more differences may be reported to the server 16). Further, the processor 30 may compute and send to the server 16 information derived from the time(s) spent within the coverage range of each of the access points 18. For example, the processor 30 may compute and send a total time Ttot spent by the mobile device 12 within the coverage range of each access point 18. The total time Ttot is an aggregate of the individual times DX spent in the various coverage ranges, i.e., Ttot=D1+D2+ . . . +DN. The processor 30 may compute and send an average time Tavg spent in the coverage range of each of the access points 18 as determined by the individual times DX spent. The average time Tavg is the total time Ttot divided by the number of times the access point 18 was detected, i.e., Tavg=Ttot/N=(D1+D2+ . . . +DN)/N. The processor 30 may compute a ratio of time spent within communication range per report interval. For example, the processor may compute this ratio as Trat=Ttot/T=(D1+D2+ . . . +DN)/T, where T is the report interval (e.g., the time since the last reporting of the scan list 40, or the time since the last reporting of the ratio Trat). The processor 30 may maintain the timestamps, the times spent, the total time Ttot spent, and the average time Tavg spent for each access point 18 and report these data to the server 16 as part of the scan list 40. The processor 30 may reset the values for these data once reported such that the reported data will be for the most recent reporting time period (i.e., an upload time period that is the time between the two most-recent reports (e.g., scan lists 40) being sent to the server 16). The processor 30 may compute the total time Ttot and/or average time Tavg for individual access points 18 and/or for one or more groups of multiple access points 18 and/or for a geographic region such as a tile. As shown in the scan list 40, in addition to the individual times spent DX, the total time Ttot, and the average time Tavg, the first detection timestamp T1 for each access point 18 in the reporting time period and the last no-detection timestamp T2 in the reporting time period may be sent to the server 16, e.g, included in the scan list 40. The reported values may be used, e.g., by the processor 60 of the server 16, to predict crowd entry and/or exit intervals for the corresponding region(s), crowd entry and/or exit times for the corresponding region(s), average times spent by users in the region(s), crowd density vs. time profiles, etc.

The indication(s) of time(s) within communication range of the access point(s) 18 may be determined for one or more levels. The timestamps, DX, Ttot, and/or Trat values may be determined at a single AP level, a cluster of APs level, and/or a tile (or other region) level. Which level(s) is(are) determined may be decided or suggested by the server 16, and the mobile device 12 may collect and determine the information as appropriate, and provide information to the server 16 (e.g., upload the timestamps). The server 16 may use this information from multiple mobile devices 12 to perform statistical analysis to determine and/or predict crowd entry times, crowd exit times, crowd density over time, average time spent at a region, etc.

Figure 4:
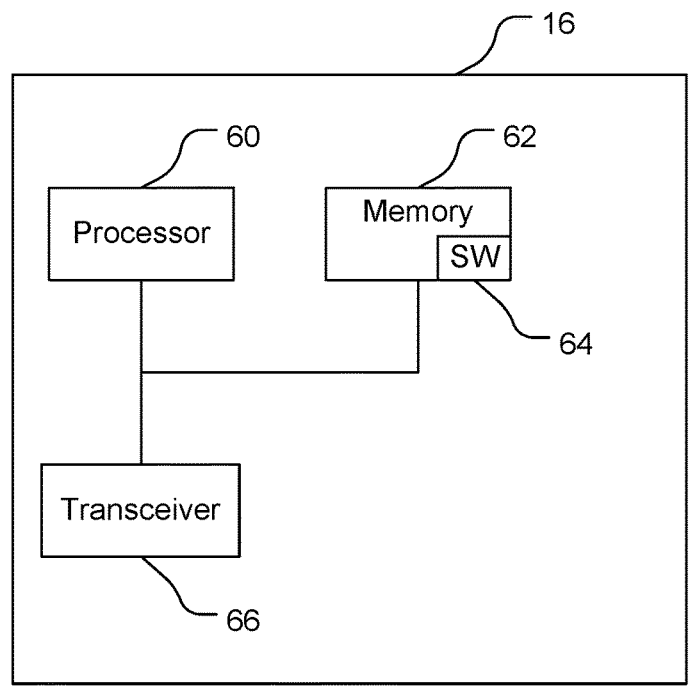
FIG. 4 is a simplified block diagram of components included in a server shown in FIG. 1.

Referring to FIG. 4, with further reference to FIGS. 1-3, the server 16 comprises a computer system including a processor 60, memory 62 including software 64, and a transceiver 66. The transceiver 66 is configured to send and receive signals from and to the access points 18 and the base stations 20. The processor 60 preferably includes an intelligent hardware device, e.g., a central processing unit (CPU) such as those made or designed by QUALCOMM®, ARM®, Intel® Corporation, or AMD®, a microcontroller, and/or an application specific integrated circuit (ASIC), etc. The processor 60 may comprise multiple separate physical entities that can be distributed in the server 16. The memory 62 includes random access memory (RAM) and read-only memory (ROM). The memory 62 is a non-transitory processor-readable storage medium that stores the software 64 which is processor-readable, processor-executable software code containing processor-readable instructions that are configured to, when executed, cause the processor 60 to perform various functions described herein (although the description may refer only to the processor 60 performing the functions). Alternatively, the software 64 may not be directly executable by the processor 60 but configured to cause the processor 60, e.g., when compiled and executed, to perform the functions. The processor 60 is communicatively coupled to the memory 62 and the transceiver 66 and configured to perform a variety of functions, e.g., in accordance with the software 64.

Figure 5:
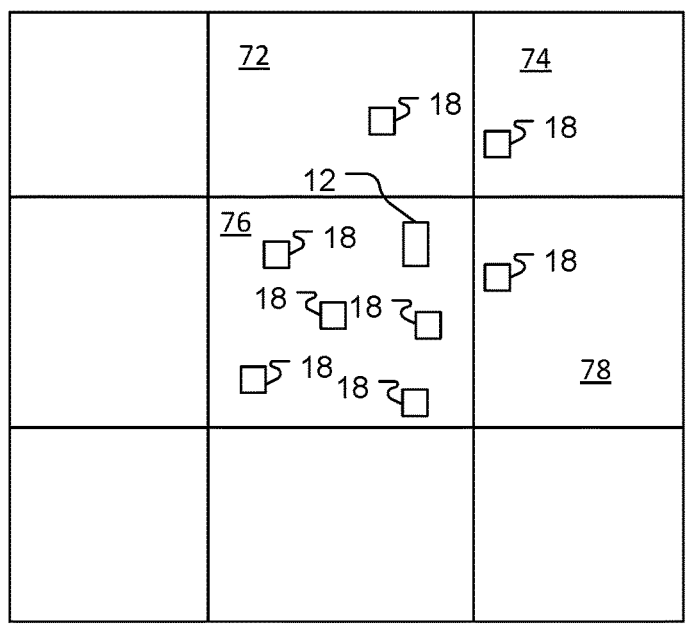
FIG. 5 is a simplified diagram of a mobile device and access points disposed in geographic regions.

The processor 60 may be configured to receive, from source mobile devices via the transceiver, indications of access point detection corresponding to different regions. For example, the processor 60 can receive the scan list 40 from each of the mobile devices 12 with indications of the access points 18 within communication range of the mobile device 12. Referring also to FIG. 5, the access points 18 correspond to regions 72, 74, 76, 78. Here, the regions 72, 74, 76, 78 are identically-sized and shaped square portions of a grid independent of the locations or coverage areas of the access points 18. For example, the regions 72, 74, 76, 78 may be 1 km×1 km geographic tiles, but this is an example only and other shapes and sizes of regions may be used. Different regions may have different shapes and/or sizes. Some regions may be the coverage areas of corresponding access points 18.

The processor 60 may further be configured to determine user density for regions using indications of access point detection corresponding to respective regions, and/or may be configured to receive, or otherwise obtain, indications of user density. The user density is a measure of users per area. For example, the user density may be quantity of the mobile devices 12 per area, such as per each of the regions 72, 74, 76, 78. The user density may be a quantity of unique mobile devices 12 per area. For a given area, the user density may be indicated as a user count. The processor 60 may determine the user density repeatedly, e.g., periodically such as every five minutes (or other interval, e.g., every 10 minutes, or still another interval, and the interval may change, e.g., a shorter interval may be used during more popular times such as during meal times for a restaurant). Thus, the processor 60 determines user density for each region at different times, and stores indications of the user density (perhaps just a user count) in conjunction with the corresponding regions and the corresponding time. By collecting the user density for individual times, the user density may be determined for different time windows (time slots, time periods) such as morning, afternoon, evening, night, each hour of the day, custom time durations, etc. Thus, the processor 60 may determine the user density as a present user density (using the most recent scan lists 40) or a historical user density (e.g., determined using scan lists 40 earlier than the most-recent scan lists 40 from the mobile devices 12). The historical user density may be from a single previous scan list 40 from each of the source mobile devices (and thus attributed to a single time even if the scan lists 40 were not produced simultaneously and/or the scans performed to obtain the information for the scan lists 40 were not performed simultaneously). The historical user density may be for a time period based on multiple user density determinations, e.g., determined using multiple previous scan lists 40 provided by each of the source mobile devices. The processor 60 may be configured to determine the historical user density for multiple time windows (e.g., density during weekday mornings, during weekday rush hours, during typical meal times, etc.).

The processor 60 may be configured to determine the user density in a variety of ways. For example, the processor 60 may analyze the received scan lists 40 and determine all regions that contain an access point 18 in the scan list 40 and increment user counts for all the corresponding regions. The processor 60 may increment user counts for all regions, or all APs 18, or for one or more clusters of the APs 18, e.g., that are disposed physically proximate to each other such as in a single venue. Preferably, the processor 60 is configured to increment the count of a region only by one even if multiple access points 18 from a single region are in the scan list 40. As another example, the processor 60 may analyze the received scan lists 40 and increment the user count only by one and for only one region per scan list 40 even if access points 18 for more than one region appear in a single scan list 40. To select which region whose user count to increment when access points 18 for more than one region appear in a scan list 40, the processor 60 may attempt to determine the region in which the mobile device 12 was when the corresponding scan was performed, e.g., by assessing RSSI values (e.g., and assuming the region of the mobile device 12 is the region of the access point 18 with the highest corresponding RSSI value), by performing multilateration using RSSI values and access point locations, by inferring a location based on the locations of the APs 18 in the scan list 40, etc. The processor 60 may increment the user count for only the region in which the mobile device 12 resides if the mobile device 12 determines its location (e.g., using one or more techniques discussed above) and reports (e.g., in the scan list 40) its location to the server 16. If a mobile device 12 only sends the scan list 40 in response to a change in the access points 18 on the scan list 40 (i.e., in communication with the mobile device 12) or only in response to entering or exiting a venue or a region (e.g., a tile), then the server 16 may increase the user count(s) of one or more regions as appropriate in view of the mobile device 12 having been in communication range of all of the access points 18 that were on each of the last two scan lists 40 from the mobile device 12. Alternatively, the source mobile device 12 may send an indication of each AP 18 heard by (from which a signal is received by) the source mobile device 12 and the time over which the AP 18 was heard (e.g., by sending a start or end time and a duration, or by sending the start and end times of receipt of the signal from the AP 18, i.e., the first and last passive scan times in a consecutive series of passive scans in which a signal from the AP 18 is received). The source mobile devices 12 need not provide any information regarding the user of the mobile device 12, a route of the mobile device 12, etc., but the mobile device 12 preferably provides the identity of the mobile device, e.g., to avoid multiple counting of a single mobile device 12 as discussed above.

Figure 6:
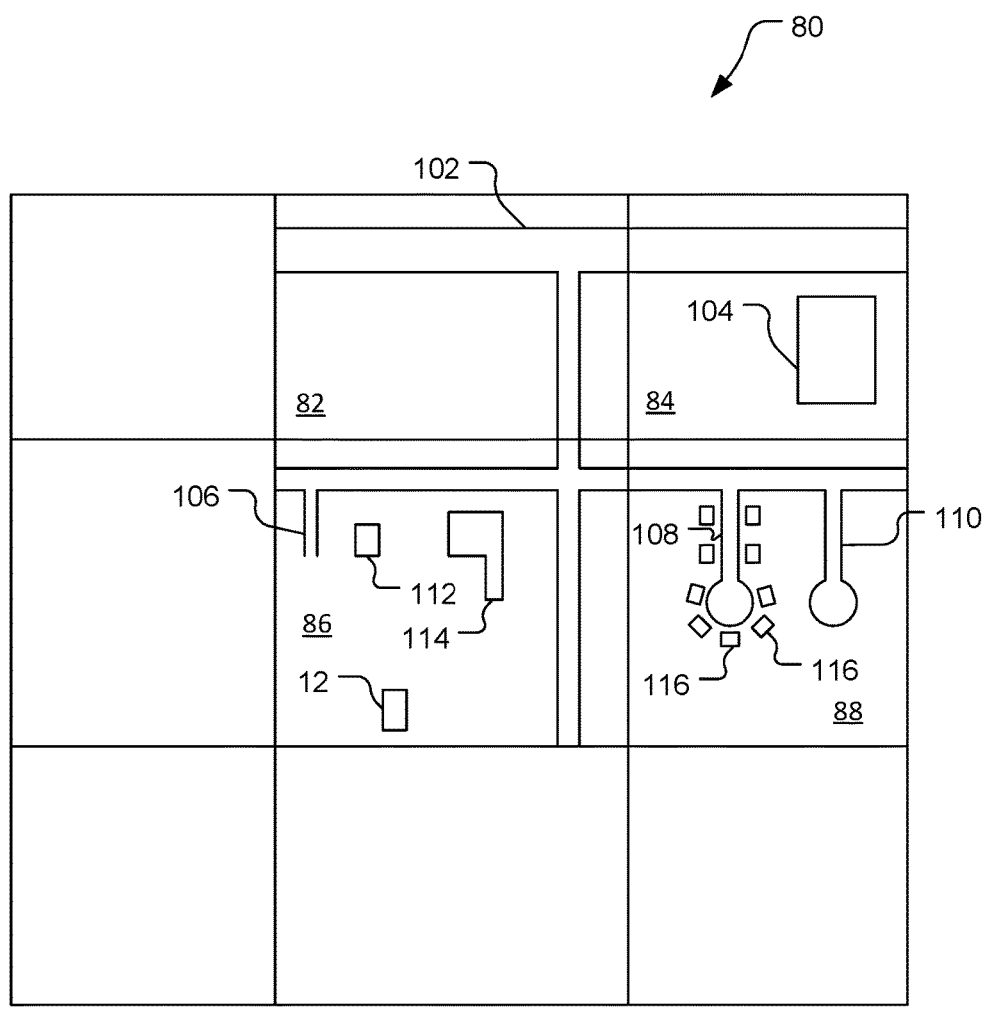
FIG. 6 is a simplified diagram of a map that is divided into map portions with different resolutions.

Referring also to FIG. 6, the processor 60 may further be configured to produce a map 80 with map portions corresponding to the regions. While the map portions correspond to the regions, there is not necessarily a one-to-one correspondence. A single region may contain multiple map portions, or one or more map portions and a part of one or more map portions, or parts of multiple map portions. For example, a single 1 km×1 km tile may be a region, but there may be multiple map portions within that region, e.g., such that the processor 60 can determine the user density for areas smaller than the regions, e.g., venues within the regions. As another example, regions may be coverage areas of APs 18 while map portions may be 1 km×1 km geographic tiles. The map portions and the regions may be the same, that is, have a one-to-one correspondence such as 1 km×1 km geographic tiles. Thus, for example, in the map 80, map portions 82, 84, 86, 88 are identical to the regions 72, 74, 76, 78.

The processor 60 is further configured to produce the map 80 with different map portions having different resolutions. Higher resolutions correspond to greater amounts of data for the map portions. For example, the map portions may contain geographic data (e.g., topographical information such as elevation and slope, bodies of water, etc.) and civic data (e.g., buildings and other structures, streets, street names, names of businesses, types of businesses, addresses of businesses and/or homes, etc.). Civic data are not limited to city-related or town-related information, but may be information of a broader scale (e.g., interstate highways, county indications, state borders, etc.). A map portion with a higher resolution will have more geographic data and/or more civic data than a map portion with a lower resolution for the same amount of features in the respective map portions. For example, a map portion with a higher resolution will be able to show a geographic map with greater detail (e.g., smaller objects and/or object features, more buildings, and/or more business names, etc.) than for a map portion with a lower resolution. In the map 80, the map portions 86, 88 have higher resolutions than the map portion 84 and thus more detail is provided in the map portions 86, 88 than in the map portion 84. For example, in the map portion 84, only a main road 102 and a large building 104 are shown, while in the map portions 86, 88, roads 106, 108, 110 are visible/displayed/shown that are smaller than the road 102, and buildings 112, 114 and houses 116 are visible/displayed/shown that are smaller than the building 104 (e.g., more buildings and streets are visible/displayed) even if such roads or buildings are present in the map portion 84 (and may be provided in the map data as appropriate as discussed below). The map portions 86, 88 may have the same resolution.

The processor 60 may be configured to produce the map 80 by generating data for the map 80 and/or by selecting map data stored in the memory 62. Thus, the processor 60 may create map data, e.g., by receiving information from one or more sources and/or by receiving and processing information from the mobile devices 12 and/or one or more other sources. The processor 60 can store map data in the memory 62, whether the data are created by the processor 60 or received by the processor 60. The memory 62 may store full-resolution map data for all the map portions of the map 80, and the processor 60 may produce the map 80 with different resolutions for different map portions by selecting less data for lower-resolution map portions. For example, the memory 62 may store different tiers of map data, and the processor 60 may select the appropriate tier(s) of data for each map portion. Also or alternatively, the processor 60 may filter out some data from the full-resolution data to produce map portions with lower resolution. Also or alternatively, the memory 62 may initially store low-resolution data and the processor 60 may request and/or generate higher-resolution data as appropriate. Still other techniques may be used to produce map portions of different resolutions.

The processor 60 may be configured to use a lower resolution for a map portion based on the user density of a corresponding region. The processor 60 may use (e.g., select) a resolution for a map portion as a function of the user density for a region that corresponds to that map portion, e.g., at least partially overlapping with the map portion, or identically coinciding with the map portion, etc. The processor 60 may use a higher resolution as a default, and use a lower resolution in response to a low user density or vice versa (using a low resolution as a default, and a higher resolution in response to a high user density). The resolution may be one of a predetermined set of available resolutions, e.g., a high resolution and a low resolution, or one of a set of more than two possible resolutions, or calculated as a function of the user density. Preferably, the processor 60 will select the resolution for a map portion based on the user density relative to one or more user density thresholds. For example, the processor 60 may select either a high resolution for a map portion where a corresponding user density is above a user density threshold and select a low resolution for a map portion where a corresponding user density is below the user density threshold. The processor 60 may select the high resolution for a map portion even if a corresponding user density is below the user density threshold, e.g., if the mobile device 12 to which the map 80 is to be sent is presently in that map portion (i.e., that a present location of the mobile device 12 is in that map portion), moves into that map portion, or is expected to move into that map portion, e.g., if the mobile device is near and moving toward that map portion. The user density threshold may be absolute (e.g., 50 users per square kilometer) or relative (e.g., the number of users in a map portion being more than 10% below the number of users in another map portion, e.g., the most-dense map portion of the map 80). If the mobile device 12 moves into a new map portion that was supplied using the lower resolution, then the processor 60 may send at least that map portion to the mobile device with the high resolution. Further, if a user of the mobile device 12 chooses to zoom in on a map portion that was provided with the lower resolution, then the mobile device 12 may request, and the server 16 may provide, that map portion with the higher resolution.

The processor 60 may be configured to send, via the transceiver 66, the map to a destination mobile device. The processor 60 can send the map 80 to a destination mobile device 12, e.g., a mobile device 12 that requested a map or is otherwise in need of a map (e.g., for navigation). The destination mobile device may be one of the source mobile devices that provided a scan list 40 to the server 16 to determine the user density. By sending the map 80 with one or more map portions being at a lower resolution, less data are sent by the server 16 to the mobile device 12 than if the full-resolution map data for all map portions are sent to the mobile device 12. This may reduce the resources used to transmit the map 80 to the mobile device 12 and/or the resources used by the mobile device 12 to process and/or store the map 80.

The processor 60 may be configured to send, to the destination mobile device 12, a popularity indication of a venue within a map portion. For example, the processor 60 may send an indication to the destination mobile device 12 that a particular restaurant is popular between the hours of 11:00 AM-2:00 PM, or that the same restaurant is unpopular between the hours of 3:00 PM-5:00 PM. The popularity indication may, for example, be an indication of the user density for the venue, the average user density for the venue for all time or for a window of time, a range of user density (e.g., low popularity, medium popularity, high popularity), etc.

The processor 60 may be configured to infer information about a map portion or a part of a map portion, e.g., a venue in the map portion, and to send the inferred information to the destination mobile device 12. For example, the processor 60 may be configured to determine and send, to the destination mobile device 12, an indication of an opening time of a venue and/or a closing time of the venue based on a change in a historical user density associated with the venue and corresponding to at least one of the opening time or the closing time, respectively, the venue being within a map portion of the map 80. For example, the processor 60 may determine that the user density of a venue changes from near zero to a significant value (e.g., a value indicating more than just employees are at or in the venue) at a particular time, e.g., 8:00 AM. The processor 60 may determine that the opening time of the venue is therefore 8:00 AM and report this to the destination mobile device 12. Similarly, the processor 60 may determine that the user density of a venue changes from a significant value (e.g., a value indicating more than just employees are at or in the venue) to near zero at a particular time, e.g., 10:00 PM. The processor 60 may determine that the closing time of the venue is therefore 10:00 PM and report this to the destination mobile device 12. The processor 60 may report opening times and/or closing times that are consistent with user activity even if those times are inconsistent with advertised data (e.g., store hours posted on the venue's website or another website such as a venue-review website or a navigation website, or provided by a navigation app). Thus, the user of the mobile device 12 may be provided with more accurate, more up-to-date, data than is otherwise available. The processor 60 may provide the opening and/or closing time in response to a request from the mobile device 12, e.g., a request for the hours of operation of a venue. To determine the opening and/or closing times, the processor 60 may analyze the user density data for a single day or several days as opposed to an average over all data (which may include changes in the opening and/or closing times). Further, the processor 60 may identify changes in the determined opening and/or closing times, e.g., if the opening or closing time (determined by analyzing user density change) changes, and especially if the opening or closing time changes and then the change is maintained (e.g., the opening time as indicated by user density changes from 8:00 AM to 9:00 AM and then is consistent at 9:00 AM). The processor 60 may respond to an inquiry from a user regarding a venue whose inferred hours of operation has changed by informing the user of the venue's inferred hours of operation.

Figure 7:
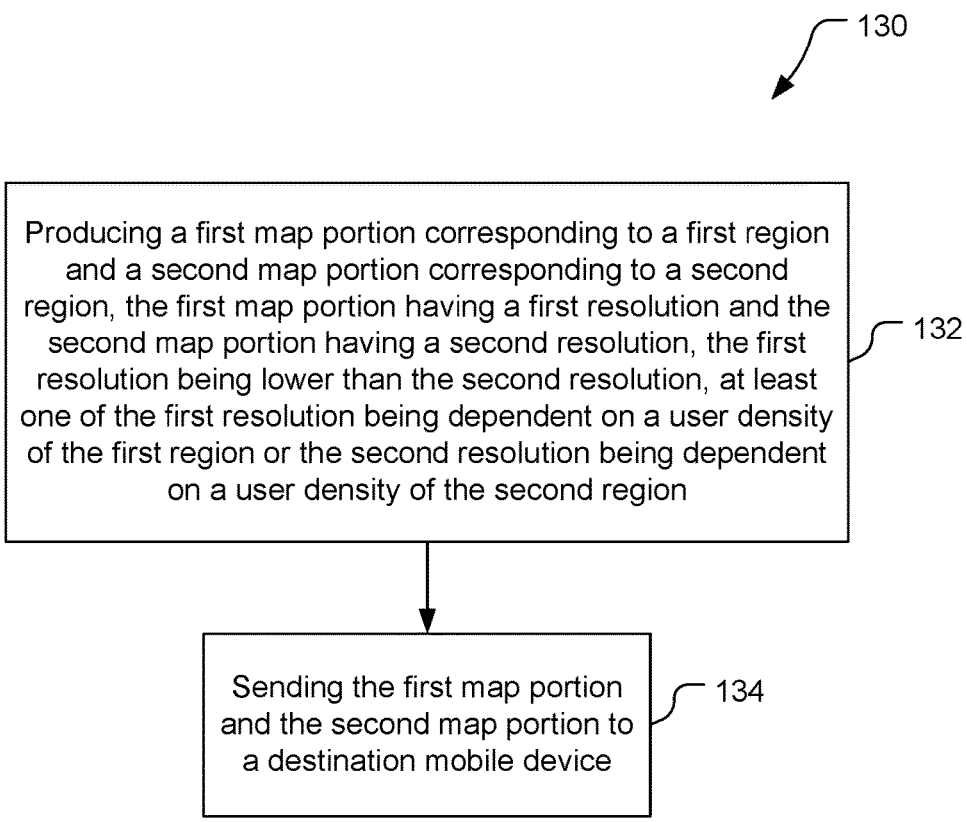
FIG. 7 is a block flow diagram of an example process of determining and using user density.

Referring to FIG. 7, with further reference to FIGS. 1-6, a process 130 of determining and using user density includes the stages shown. The process 130 is, however, an example only and not limiting. The process 130 can be altered, e.g., by having stages added, removed, rearranged, combined, performed concurrently, and/or having single stages split into multiple stages.

At stage 132, the process 130 includes producing a first map portion corresponding to a first region and a second map portion corresponding to a second region, the first map portion having a first resolution and the second map portion having a second resolution, the first resolution being lower than the second resolution, at least one of the first resolution dependent on the user density of the first region or the second resolution being dependent on a user density of the second region. The first map portion will include at least some of, although not necessarily all of, the first region. The server 16 produces a map, for example the map 80 with at least two map portions with different resolutions. The server 16 may produce the map with the first resolution for the first map portion based on the user density of the first region, e.g., by using the first resolution in response to the user density of the first region being below a threshold user density (discussed above). Further, the server 16 may determine that a user density corresponding to a mobile-device map portion (e.g., the user density of a region that corresponds to (e.g., is at least partially included in) a map portion), that includes a present location of a destination mobile device 12 (e.g., a mobile device 12 to receive the map 80), is below the threshold user density. The server 16 may send the mobile-device map portion to the destination mobile device 12 with the second resolution, e.g., after selecting the second resolution (or at least not selecting the first resolution) for the mobile-device map portion. Thus, the portion of the map 80 that includes the destination mobile device 12 preferably has a high(er) resolution even if a user density for that map portion is (relatively) low.

The server 16 may produce the first map portion and the second map portion using user density information received from one or more other entities and/or from user density information determined by the server 16. For example, the process 130 may include receiving, from source mobile devices, indications of access point detection corresponding to a first region and a second region. The mobile devices 12 detect (e.g., receive signals during passive scans) from APs 18 and send indications of the detections to the server 16 that receives the indications. The detections of the signals correspond to regions such as the regions 72, 74, 76, 78. The detections correspond to the regions 72, 74, 76, 78 in that the location of the detecting mobile device 12 and/or the location(s) of detected AP(s) 18 are in the corresponding region(s) or are otherwise associated with the region(s). Any of the mobile devices 12 from which an indication of access point detection is received is referred to as a source mobile device 12. Further, the process 130 may include determining user density for each of the first region and the second region using the indications of access point detection corresponding to the first region and the second region, respectively. The server 16 determines the user density, e.g., in any of the manners discussed above, and/or in another manner, using the indications of access point detection received from the source mobile devices 12. For example, the server 16 may determine the user density by determining a quantity of unique source mobile devices 12 from which the indications of access point detection corresponding to the first region have been received. This may help, for example, avoiding using employees of a store count toward the user density.

The server 16 may determine the user density by determining a historical user density for each of multiple time windows. Further, the same source mobile device 12 may be used repeatedly for the user density determination, e.g., if sufficient time (e.g., one day) has passed between indications of detection of the same AP 18 by the same source mobile device 12. The map portions produced by the server 16 may be identical to regions corresponding to the AP detection indications received by the server 16 from the source mobile devices 12.

At stage 134, the process 130 includes sending the first map portion and the second map portion to a destination mobile device. The server 16 sends the map portions, and preferably the whole map 80, to the destination mobile device 12. By sending the map 80 with different portions of different resolutions, use of resources (in transit and/or at the destination mobile device 12) may be reduced compared to sending the whole map 80 at the higher resolution. Further, the process 130 may include sending, to the destination mobile device, a popularity indication (as discussed above) of a venue within the first map portion or the second map portion. Also or alternatively, the process 130 may further include determining and sending, to the destination mobile device, an indication of at least one of an opening time of a venue or a closing time of the venue based on a change in a historical user density (as discussed above) associated with the venue and corresponding to at least one of the opening time or the closing time, respectively, the venue being within the first map portion or the second map portion.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, "or" as used in a list of items prefaced by "at least one of or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even though not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method of using user density, the method comprising:
producing a first map portion corresponding to a first region and a second map portion corresponding to a second region, the first map portion having a first resolution and the second map portion having a second resolution, the first resolution being lower than the second resolution, wherein the second map portion has a higher geographic data density and/or a higher civic data density than the first map portion, and wherein the first resolution is dependent on a user density of the first region, or the first resolution is dependent on the user density of the first region and the second resolution is dependent on a user density of the second region, and wherein the first resolution corresponds to the user density of the first region being below a threshold user density;
sending the first map portion and the second map portion to a destination mobile device;
determining that a user density corresponding to a mobile-device map portion, that includes a present location of the destination mobile device, is below the threshold user density; and
sending the mobile-device map portion to the destination mobile device with the second resolution.

2. The method of claim 1, further comprising:
receiving, from source mobile devices, indications of access point detection corresponding to the first region and the second region; and determining the user density of the first region and the user density of the second region using the indications of access point detection corresponding to the first region and the second region, respectively.

3. The method of claim 2, wherein determining the user density of the first region comprises determining a quantity of unique source mobile devices from which the indications of access point detection corresponding to the first region have been received.

4. The method of claim 2, wherein determining the user density of the first region comprises determining a historical user density for each of a plurality of time windows.

5. The method of claim 1, further comprising sending, to the destination mobile device, a popularity indication of a venue within the first map portion or the second map portion.

6. The method of claim 1, further comprising determining and sending, to the destination mobile device, an indication of at least one of an opening time of a venue or a closing time of the venue based on a change in a historical user density associated with the venue and corresponding to at least one of the opening time or the closing time, respectively, the venue being within the first map portion or the second map portion.

7. A server comprising:
a memory;
a transceiver; and
a processor, communicatively coupled to the memory and the transceiver and configured to:
produce a first map portion corresponding to a first region and a second map portion corresponding to a second region, the first map portion having a first resolution and the second map portion having a second resolution, the first resolution being lower than the second resolution, wherein the second map portion has a higher geographic data density and/or a higher civic data density than the first map portion, and wherein the first resolution is dependent on a user density of the first region, or the first resolution is dependent on the user density of the first region and the second resolution is dependent on a user density of the second region, and wherein the first resolution corresponds to the user density of the first region being below a threshold user density;
send, via the transceiver, the first map portion and the second map portion to a destination mobile device;
determine that a user density corresponding to a mobile-device map portion, that includes a present location of the destination mobile device, is below the threshold user density; and
send the mobile-device map portion to the destination mobile device with the second resolution.

8. The server of claim 7, wherein the processor is further configured to:
receive, from source mobile devices via the transceiver, indications of access point detection corresponding to the first region and the second region; and
determine the user density of the first region and the user density of the second region using the indications of access point detection corresponding to the first region and the second region, respectively.

9. The server of claim 8, wherein to determine the user density of the first region the processor is configured to determine a quantity of unique source mobile devices from which the processor has received indications of access point detection corresponding to the first region.

10. The server of claim 8, wherein to determine the user density of the first region the processor is configured to determine a historical user density for each of a plurality of time windows.

11. The server of claim 7, wherein the processor is further configured to determine and send, to the destination mobile device, a popularity indication of a venue within the first map portion or the second map portion.

12. The server of claim 7, wherein the processor is further configured to send, to the destination mobile device, an indication of at least one of an opening time of a venue or a closing time of the venue based on a change in a historical user density associated with the venue and corresponding to at least one of the opening time or the closing time, respectively, the venue being within the first map portion or the second map portion.

13. A non-transitory processor-readable storage medium storing processor-readable instructions configured to cause a processor to:
produce a first map portion corresponding to a first region and a second map portion corresponding to a second region, the first map portion having a first resolution and the second map portion having a second resolution, the first resolution being lower than the second resolution, wherein the second map portion has a higher geographic data density and/or a higher civic data density than the first map portion, and wherein the first resolution is dependent on a user density of the first region, or the first resolution is dependent on the user density of the first region and the second resolution is dependent on a user density of the second region, and wherein the first resolution corresponds to the user density of the first region being below a threshold user density;
send, via the transceiver, the first map portion and the second map portion to a destination mobile device;
determine that a user density corresponding to a mobile-device map portion, that includes a present location of the destination mobile device, is below the threshold user density; and
send the mobile-device map portion to the destination mobile device with the second resolution.

14. The storage medium of claim 13, further comprising instructions configured to cause the processor to:
receive, from source mobile devices, indications of access point detection corresponding to the first region and the second region; and
determine the user density of the first region and the user density of the second region using the indications of access point detection corresponding to the first region and the second region, respectively.

15. The storage medium of claim 14, wherein the instructions configured to cause the processor to determine the user density of the first region include instructions configured to cause the processor to determine a quantity of unique source mobile devices from which the processor has received indications of access point detection corresponding to the first region.

16. The storage medium of claim 14, wherein the instructions configured to cause the processor to determine the user density of the first region include instructions configured to cause the processor to determine a historical user density for each of a plurality of time windows.

17. The storage medium of claim 13, further comprising instructions configured to cause the processor to determine and send, to the destination mobile device, an indication of at least one of an opening time of a venue or a closing time of the venue based on a change in a historical user density associated with the venue and corresponding to at least one of the opening time or the closing time, respectively, the venue being within the first map portion or the second map portion.

18. A server comprising:
  means for producing a first map portion corresponding to a first region and a second map portion corresponding to a second region, the first map portion having a first resolution and the second map portion having a second resolution, the first resolution being lower than the second resolution, wherein the second map portion has a higher geographic data density and/or a higher civic data density than the first map portion, and wherein the first resolution is dependent on a user density of the first region, or the first resolution is dependent on the user density of the first region and the second resolution is dependent on a user density of the second region, and wherein the first resolution corresponds to the user density of the first region being below a threshold user density;
  means for sending the first map portion and the second map portion to a destination mobile device;
  means for determining that a user density corresponding to a mobile-device map portion, that includes a present location of the destination mobile device, is below the threshold user density; and
  means for sending the mobile-device map portion to the destination mobile device with the second resolution.

19. The server of claim 18, further comprising:
  means for receiving, from source mobile devices, indications of access point detection corresponding to the first region and the second region; and
  means for determining user density for each of the first region and the user density of the second region using the indications of access point detection corresponding to the first region and the second region, respectively.

20. The server of claim 19, wherein the means for determining the user density of the first region comprise means for determining a quantity of unique source mobile devices from which the indications of access point detection corresponding to the first region have been received.

21. The server of claim 19, wherein the means for determining the user density of the first region comprise means for determining a historical user density for each of a plurality of time windows.

22. The server of claim 18, further comprising means for determining and sending, to the destination mobile device, an indication of at least one of an opening time of a venue or a closing time of the venue based on a change in a historical user density associated with the venue and corresponding to at least one of the opening time or the closing time, respectively, the venue being within the first map portion or the second map portion.

* * * * *